US006254751B1

(12) United States Patent
Reiter et al.

(10) Patent No.: US 6,254,751 B1
(45) Date of Patent: Jul. 3, 2001

(54) PROCESS FOR THE MULTI-LAYERED COATING OF SUBSTRATES WITH ELECTROPHORETIC COATING MATERIAL AND POWDER COATING MATERIAL

(75) Inventors: Udo Reiter, Telgte; Rolf Boysen, Münster, both of (DE); Josef Rademacher, Beverly Hills, MI (US); Thomas Brücken, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/125,493

(22) PCT Filed: Feb. 21, 1997

(86) PCT No.: PCT/EP97/00831

§ 371 Date: Sep. 11, 1998

§ 102(e) Date: Sep. 11, 1998

(87) PCT Pub. No.: WO97/30796

PCT Pub. Date: Aug. 28, 1997

(30) Foreign Application Priority Data

Feb. 23, 1996 (DE) ............................................. 196 06 706

(51) Int. Cl.[7] ............................. C08F 2/58; C23C 28/00; C23F 17/00; C25D 13/00; C25D 15/00

(52) U.S. Cl. .......................... 204/487; 204/487; 204/488; 205/120

(58) Field of Search .................................... 204/487, 488, 204/493, 496; 427/110; 205/120, 121, 128

(56) References Cited

U.S. PATENT DOCUMENTS

| | | | |
|---|---|---|---|
| 3,617,458 | 11/1971 | Brockman | 204/181 |
| 3,640,926 | 2/1972 | Slater | 260/18 |
| 3,663,389 | 5/1972 | Koral et al. | 204/181 |
| 3,998,716 * | 12/1976 | Masar | 204/181 |
| 4,789,566 * | 12/1988 | Tatsuno | 427/388.2 |
| 4,847,337 * | 7/1989 | Hefner | 525/531 |
| 5,507,928 * | 4/1996 | Bohmert | 204/488 |
| 5,552,487 | 9/1996 | Clark et al. | 525/131 |

FOREIGN PATENT DOCUMENTS

| | | | |
|---|---|---|---|
| 27 01 002 A1 | 1/1977 | (DE) . | |
| 36 30 667 A1 | 9/1986 | (DE) . | |
| 43 13 762 C1 | 4/1993 | (DE) . | |
| 0 004 090 A2 | 2/1979 | (EP) . | |
| 0 261 385 A2 | 8/1987 | (EP) . | |
| 0 525 867 A1 | 7/1992 | (EP) | B05D/5/06 |
| 0525867 A1 * | 3/1993 | (EP) | B05D/5/06 |
| 0 646 420 A1 | 9/1994 | (EP) | B05D/7/00 |
| 63-274800 | 11/1998 | (JP) | C25D/13/00 |

* cited by examiner

*Primary Examiner*—Kathryn Gorgos
*Assistant Examiner*—J. Maisano

(57) ABSTRACT

The present invention relates to a process for the multilayer coating of substrates with electrodeposition and powder coating materials, in which electrodeposition is used to apply at least one coat (2) of electrodeposition coating material to the substrate (1), after deposition the substrate (1) is, if desired, wholly or partially air-dried, a coat of powder coating material (3) is then applied, and finally electrodeposition coating material and powder coating material are jointly baked.

28 Claims, 1 Drawing Sheet

PROCESS FOR THE MULTI-LAYERED COATING OF SUBSTRATES WITH ELECTROPHORETIC COATING MATERIAL AND POWDER COATING MATERIAL

The present invention relates to a process for the multilayer coating of substrates with a primer coat of electrodeposition coating material and with a topcoat of powder coating material.

The coating of first and foremost electrically conductive substrates with an electrodeposition coating material is a process which has been common for many years. The electrodeposition coating material in this process is present as an (aqueous) dispersion in a bath. The substrate to be coated is connected as one of two electrodes and is lowered into this bath. This is followed by the electrophoretic deposition of the electrodeposition coating material on the substrate. After a sufficiently thick coat of material has been obtained, the coating operation is ended and the coat of material is dried and, generally, baked.

Resins which can be electrodeposited at the cathode are described, for example, in U.S. Pat. No. 3,617,458. They comprise crosslinkable coating compositions which deposit themselves at the cathode. These coating compositions are derived from an unsaturated addition polymer which comprises amine groups and carboxyl groups and from an epoxidized material.

U.S. Pat. No. 3,663,389 describes cationically electrodepositable compositions which are mixtures of specific amine-aldehyde condensates and a large number of cationic resinous materials, one of these materials being preparable by reacting an organic polyepoxide with a secondary amine and solubilizing the product with acid.

U.S. Pat. No. 3,640,926 discloses aqueous dispersions which can be electrodeposited at the cathode and consist of an epoxy resin ester, water and tertiary amino salts. The epoxy ester is the reaction product of a glycidyl polyether and a basic unsaturated oleic acid. The amine salt is the reaction product of an aliphatic carboxylic acid and a tertiary amine.

Epoxy- and polyurethane-based binders for use in binder dispersions and pigment pastes are, moreover, known in numerous configurations. Reference may be made, for example, to DE-27 01 002, EP-A-261 385, EP-A-004 090 and DE-C 36 30 667.

The coating of substances with powder coating materials is also a common process. In this case, the dry, pulverulent coating material is applied uniformly to the substrate that is to be coated. Subsequently, through heating of the substrate, the coating material is melted and baked. The particular advantages of powder coating materials are, inter alia, that they manage without solvents and that the overspray losses which occur with conventional coating materials are avoided, since virtually all of the nonadhering powder coating material can be recycled. The powder coating is applied to the substrate preferably by electrostatic adhesion, generated through the application of high voltage or by frictional charging.

Combination coating with electrodeposition coating material and powder coating material is also known from the prior art. For example, in accordance with DE-C 4313762, a powder coat is first of all sintered on and then an electrodeposition coating material is applied. It is also known, from JP 63274800, to apply an electrodeposition coating material and to dry it at 110° C., to apply a powder coating material, and, finally, to jointly bake both coats. This two-coat or multicoat system enables the product properties to be optimized. Priming with electrodeposition coating material may also become necessary in the case of substrates which, for technical reasons related to their material or on geometric grounds, are relatively unaminable to powder coating material. A typical application of this multicoat system is the coating of heating-system radiators. The procedure here is such that, following the coating of the substrate with the electrodeposition coating material, said coating material is first baked in a drier. The temperatures in the drier typically reach more than 100° C., and the electrodeposition coating material sets. Following this baking operation, the primed substrate is cooled again before then being provided with the powder coat. A second baking operation is then necessary to cure the applied powder coating material. The disadvantage of this procedure is that the substrate has to be twice dried and heated during the coating operation. This is very energy-intensive, and entails considerable capital and operating costs.

Against the background of this prior art, the invention has set itself the object of developing a process for the multilayer coating of substrates with electrodeposition and powder coating materials which operates more simply, more cost-effectively and with greater energy savings while maintaining identical product qualities. This object is achieved in accordance with the invention by a process in which a) to a substrate (1) made preferably of metal, especially iron or zinc, at least one coat (2) of liquid coating material, preferably electrodeposition coating material, is applied, b) after deposition the substrate (1) is, if desired, wholly or partially dried, c) at least one coat of powder coating material (3) is applied, and d) electrodeposition coating material and powder coating material are jointly baked, where drying takes place at temperatures of ≦100° C., preferably ≦40° C.

The process of the invention therefore omits a separate drying and baking step for the electrodeposition coating material before the powder coating material is applied. Instead, both coating materials are baked in a joint step. This approach represents a considerable simplification of the coating operation. The omission of one baking operation reduces both the capital costs and the operating costs. Only a single baking oven needs to be provided and operated. As a result, there is also a saving of heating energy. In addition, the overall processing time for the coating operation is shorter, and so the productivity of the unit is increased.

Since the substrate to be coated is preferably preprimed with an electrodeposition coat, said substrate is principally an electrically conductive substrate. In particular, it can be a metal, preferably iron or zinc.

In step a), in accordance with the invention, a liquid coating material is applied to the above-described substrate. This can be done using all coating techniques known in the prior art.

As the coating material it is possible to use all liquid coating materials which are known in the art. Suitable in particular are all customary aqueous electrodeposition coating materials. It is possible, for example, to use electrodeposition coating materials which comprise epoxy resins, which are preferably amine-modified, and/or blocked aliphatic polyisocyanate, pigment paste and, if desired, further additives.

In a preferred embodiment of the process of the invention the electrodeposition coat, following removal of the substrate from the bath, is predried, preferably by air drying with the aid, for example, of a fan. The air may preferably be dry air, e.g. compressed air.

Simultaneously with the drying operation, gentle heating of the substrate is performed in the course of which, however, flow or baking of the coating material must be avoided. The primary aim, rather, is—when using the customary aqueous electrodeposition coating materials—to remove the film of water remaining thereon. For this reason, temperatures of ≦100° C. are preferred. Preferably, temperatures of ≦80° C., with particular preference ≦60° C. and, most preferably, of ≦40° C. should be observed.

The drying operation extends over a period of not more than 60 minutes. The drying time is preferably ≦40 minutes, with particular preference ≦30 minutes and, most preferably, ≦20 minutes.

The predrying of the electrodeposition coat is preferably performed until its content of solvents has fallen such that on subsequent baking the substance of the coat decreases by less than 20%, preferably less than 13%, this is because, when baking an electrodeposition coat, there is always a loss of substance through the evaporation of residual solvents and through the emission of elimination products which form during the crosslinking of the coating material. The gaseous expulsion of these substances may result in bubbles being formed, so that the coat of material overall is destroyed. If predrying is carried out up to the maximum limits of the solvent content as indicated above, however, the gaseous expulsion of the residual solvents and of the elimination products does not lead to any deterioration in product quality.

In accordance with the prior art the baking of the electrodeposition coat has been carried out before application of the powder coating material, in order to avoid the above-described degassing phenomena. In the view of those skilled in the art, it was not considered possible to apply the powder coating material to an unbaked electrodeposition coat without both coats being destroyed by the degassing process. This prejudice has been overcome with the process of the invention.

A powder coating material is applied, in accordance with the invention, to the abovementioned electrodeposition coating material.

The essential factor is that the crosslinking temperatures of the powder coating material are higher than those of the electrodeposition coating material. Preferably, the temperature difference is from 5 to 60° C., with particular preference from 10 to 40° C., with very particular preference from 10 to 30° C. and, most preferably, from 10 to 20° C.

All known coating formulations are suitable in accordance with the invention: for example those described in EP-509 392, EP-509 393, EP-322 827, EP-517 536, U.S. Pat. Nos. 5,055,524 and 4,849,283. In particular, the powder coating material can consist of epoxy resins, also epoxidized Novolaks, of crosslinking agents, preferably phenolic or amine-type hardeners or bicyclic guanidines, catalysts, fillers and, if desired, auxiliaries and additives.

The powder coating materials employed in accordance with the invention preferably comprise epoxy resins, phenolic crosslinking agents, catalysts, assistants and also, if desired, auxiliaries and powder-typical additives, and flow aids.

Suitable epoxy resins are all solid epoxy resins having an epoxy equivalent weight of between 400 and 3000, preferably from 600 to 2000. These are principally epoxy resins based on bisphenol A and bisphenol F. Preference is given to epoxidized Novolak resins. These preferably have an epoxide equivalent weight of from 500 to 1000.

The epoxy-resins based on bisphenol A and bisphenol F generally have a functionality of less than 2, the epoxidized Novolak resins a functionality of more than 2. Particular preference is given in the powder coating materials of the invention to epoxidized Novolak resins having an average functionality in the range from 2.4 to 2.8 and having an epoxide equivalent weight in the range from 600 to 850. In the case of the epoxidized Novolak resins, the phenolic hydroxyl groups are etherified with alkyl, acrylic or similar groups. By reacting the phenolic hydroxyl groups with epichlorohydrides [sic], epoxide groups are introduced into the molecule. This procedure, starting from Novolaks, forms the so-called epoxy-Novolak. The epoxidized Novolaks are structurally related to bisphenol A resins. Epoxidized Novolak resins can be prepared by epoxidizing Novolaks which consist, for example, of from 3 to 4 phenol nuclei connected to one another by way of methylene bridges. Alkyl-substituted phenols which are reacted with formaldehyde can also be used as Novolak resins.

Examples of suitable epoxy resins are the products obtainable commercially under the following names:

Epikote 1004, 1055, 3003, 3004, 2017 from Shell-Chemie, DER 640, 671, 662, 663U, 664, 667 from Dow, and Araldit GT 6063, 6064, 6084, 6097, 7004, 7220, 7225 from Ciba Geigy.

Examples of a suitable epoxy-functional binder for the transparent powder coating materials are epoxy-functional polyacrylate resins which can be prepared by copolymerizing at least one ethylenically unsaturated monomer which comprises at least one epoxide group in the molecule with at least one further ethylenically unsaturated monomer which contains no epoxide group in the molecule, at least one of the monomers being an ester of acrylic acid or methacrylic acid.

Epoxy-functional polyacrylate resins are known (cf. e.g. EP-A-299 420, DE-B-22 14 650, DE-B-27 49 576, U.S. Pat. Nos. 4,091,048 and 3,781,379).

Examples of the ethylenically unsaturated monomers which comprise at least one epoxide group in the molecule are glycidyl acrylate, glycidyl methacrylate and allyl glycidyl ether.

Examples of ethylenically unsaturated monomers which contain no epoxide group in the molecule are alkyl esters of acrylic and methacrylic acid which contain 1 to 20 carbon atoms in the alkyl radical, especially methyl acrylate, methyl methacrylate, ethyl acrylate, ethyl methacrylate, butyl acrylate, butyl methylacrylate 2-ethylhexyl acrylate and 2-ethylhexyl methacrylate. Further examples of ethylenically unsaturated monomers which contain no expoxide groups in the molecule are acids, such as acrylic acid and methacrylic acid, acid amides, such as acrylamide and methacrylamide, vinylaromatic compounds, such as styrene, methylstyrene and vinyltoluene, nitriles, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The epoxy-functional polyacrylate resin normally has an epoxide equivalent weight of from 400 to 2500, preferably from 500 to 1500 and, with particular preference, from 600 to 1200, a number-average molecular weight (determined by gel permeation chromatography using a polystyrene standard) of from 1000 to 15,000, preferably from 1200 to 7000 and, with particular preference, from 1500 to 5000, and a glass transition temperature ($T_g$) of from 30 to 80, preferably from 40 to 70 and, with particular preference, from 50 to 70° C. (measured with the aid of differential scanning calorimetry (DSC)).

The epoxy-functional polyacrylate resin can be prepared by generally well-known methods, by free-radical addition polymerization.

Examples of suitable hardeners for the epoxy-functional polyacrylate resin are polyanhydrides of polycarboxylic acids or of mixtures of polycarboxylic acids, especially polyanhydrides of dicarboxylic acids or of mixtures of dicarboxylic acids.

Polyanhydrides of this kind can be prepared by removing water from the polycarboxylic acid or mixture of polycarboxylic acids, with two carboxyl groups being reacted in each case to form one anhydride group. Preparation techniques of this kind are well known and thus require no further elucidation.

For the curing of the epoxy resins, the powder coating material of the invention comprises phenolic or amine-type hardeners. Bicyclic guanidines may also be employed.

In this context it is possible, for example, to use any desired phenolic resin provided it has the methylol functionality required for reactivity. Preferred phenolic resins are products, prepared under alkaline conditions, of the reaction of phenol, substituted phenols and bisphenol A with formaldehyde. Under such conditions the methylol group is linked to the aromatic ring in either ortho or para position. In accordance with the present invention, the phenolic crosslinking agents employed are, with particular preference, hydroxyl-containing bisphenol A resins or bisphenol F resins having a hydroxy equivalent weight in the range from 180 to 600 and, with particular preference, in the range from 180 to 300. Phenolic crosslinking agents of this kind are prepared by reacting bisphenol A or Bisphenol F with glycidyl-containing components, such as, for example, with the diglycidyl ether of bisphenol A. Phenolic crosslinking agents of this kind are obtainable, for example, under the commercial designation DEH 81, DEH 82 and DEH 87 from Dow, DX 171 from Shell-Chemie and XB 3082 from Ciba Geigy.

In this context, the epoxy resins and the phenolic crosslinking agents are employed in such a ratio that the number of epoxide groups to the number of phenolic OH groups is approximately 1:1.

The powder coating materials of the invention comprise one or more suitable catalysts for epoxy resin curing. Suitable catalysts are phosphonium salts of organic or inorganic acids, imidazole and imidazole derivatives, quaternary ammonium compounds, and amines. The catalysts are generally employed in proportions of from 0.001% by weight to about 10% by weight, based on the overall weight of the epoxy resin and of the phenolic crosslinking agents.

Examples of suitable phosphonium salt catalysts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutylphosphonium acetateacetic acid complex. These and other suitable phosphonium catalysts are described, for example, in U.S. Pat. Nos. 3,477,990 and 3,341,580.

Examples of suitable imidazole catalysts are 2-styrylimidazole, 1-benzyl-2-methylimidazole, 2-methylimidazole and 2-butylimidazole. These and other imidazole catalysts are described, for example, in Belgian Patent No. 756,693.

In some cases, customary commercial phenolic crosslinking agents already include catalysts for epoxy resin crosslinking.

Powder coating materials based on carboxyl-containing polyesters and on low molecular mass crosslinking agents containing epoxide groups are known in large numbers and are described, for example, in EP-A-389 926, EP-A-371 522, EP-A-326 230, EP-B-110 450, EP-A-110 451, EP-B-107 888, U.S. Pat. No. 4,340,698, EP-B-119 164, WO 87/02043 and EP-B-10 805.

Particularly suitable are powder coating materials according to DE 43 30 404.4, which comprise as film-forming material A) 35.0–92.2% by weight of carboxyl-containing polyesters having an acid number of 10–150 mg of KOH/g, B) 0.8–20.1% by weight of low molecular mass curing agents containing epoxide groups, C) 3.7–49.3% by weight of epoxy-functional polyacrylate resins having an epoxide equivalent weight of 350–2000, and D) 0.5–13.6% by weight of low molecular mass di- and/or polycarboxylic acids and/or di- and/or polyanhydrides, the sum of the proportions by weight of A), B), C) and D) being in each case 100% by weight and the ratio of the epoxide groups of the powder coating materials to the sum of the carboxyl and anhydride groups of the powder coating materials being 0.75–1.25:1.

The carboxyl-containing polyesters used as component A) have an acid number in the range of 10–150 mg of KOH/g, preferably in the range of 30–100 mg of KOH/g. The hydroxyl number of the polyester resins should be ≦30 mg of KOH/g. Preference is given to employing polyesters having a carboxy functionality of ≧2. The polyesters are prepared by the customary methods (compare e.g. Houben Weyl, Methoden der Organischen Chemie, 4th Edition, Volume 14/2, Georg Thieme Verlag, Stuttgart 1961).

Suitable as a carboxylic acid component for preparing the polyesters are aliphatic, cycloaliphatic and aromatic di- and polycarboxylic acids, such as phthalic acid, terephthalic acid, isophthalic acid, trimellitic acid, pyromellitic acid, adipic acid, succinic acid, glutaric acid, pimelic acid, suberic acid, cyclohexanedicarboxylic acid, azelaic acid, sebacic acid and the like. These acids can also be employed in the form of their esterifiable derivatives (e.g. anhydrides) or of their transesterifiable derivatives (e.g. dimethyl esters).

As an alcohol component for preparing the carboxyl-containing polyesters A), the commonly employed di- and/or polyols are suitable, examples being ethylene glycol, propane-1,2-diol and propane-1,3-diol, butane diols, diethylene glycol, triethylene glycol, tetraethylene glycol, hexane-1,6-diol, neopentyl glycol, 1,4-dimethylolcyclohexane, glycerol, trimethylolethane, trimethylolpropane, pentaerythritol, ditrimethylolpropane, dipentaerythritol, diglycerol and the like.

The polyesters thus obtained can be employed individually or as a mixture of different polyesters. The polyesters suitable as component A) generally have a glass transition temperature of more than 30° C.

Examples of suitable commercial polyesters are the products obtainable commercially under the following trade names: Crylcoat 314, 340, 344, 2680, 316, 2625, 320, 342 and 2532 from UCB, Drogenbos, Belgium; Grilesta 7205, 7215, 72-06, 72-08, 72-13, 72-14, 73-72, 73-93 and 7401 from Ems-Chemie; Neocrest P670, P671, P672, P678, P662 from ICI, and Uralac P2400, P2450, P5980, PS 998, P 3561 Uralac P3400 and Uralac P5000 from DSM.

Also suitable as an acidic polyester component A) are unsaturated, carboxyl-containing polyester resins. These are obtained by polycondensation of, for example, maleic acid, fumaric acid or other aliphatic or cycloaliphatic dicarboxylic acids having an ethylenically unsaturated double bond, together if desired with saturated polycarboxylic acids, as polycarboxylic acid component. The unsaturated groups can also be introduced into the polyester through the alcohol component, e.g. by trimethylolpropane monoallyl ether.

The powder coating materials of the invention comprise as component B) 0.8–20.1% by weight of low molecular mass curing agents containing epoxide groups. An example of a particularly suitable low molecular mass curing agent containing epoxide groups is triglycidyl isocyanurate (TGIC). TGIC is obtainable commercially, for example, under the designation Araldit PT 810 (manufacturer: Ciba Geigy). Further suitable low molecular mass curing agents containing epoxide groups are 1,2,4-triglycidyltriazoline-3,5-dione, diglycidyl phthalate, and the diglycidyl ester of hexahydrophthalic acid.

By epoxy-functional polyacrylate resins (component C) are meant polymers which can be prepared by copolymerizing at least one ethylenically unsaturated monomer which comprises at least one epoxide group in the molecule with at least one further ethylenically unsaturated monomer which contains no epoxide group, at least one of the monomers being an ester of acrylic acid or methacrylic acid.

Epoxy-functional polyacrylate resins are known (cf. e.g. EP-A-299 420, DE-B-22 14 650, U.S. Pat. Nos. 4,091,048 and 3,781,379).

Examples of the ethylenically unsaturated monomers which comprise at least one epoxide group in the molecule are glycidyl acrylate, glycidyl methacrylate and allyl glycidyl ether.

Examples of ethylenically unsaturated monomers which contain no epoxide group in the molecule are alkyl esters of acrylic and methacrylic acid which contain 1 to 20 carbon atoms in the alkyl radical, especially methyl acrylate, methyl methacrylate, ethyl acrylate, ethyl methacrylate, n-butyl acrylate, isobutyl acrylate, t-butyl acrylate and the corresponding methacrylates, 2-ethylhexyl acrylate and 2-ethylhexyl methacrylate. Further examples of ethylenically unsaturated monomers which contain no expoxide groups in the molecule are acids, such as acrylic acid and methacrylic acid, acid amides, such as acrylamide and methacrylamide, vinylaromatic compounds, such as styrene, methylstyrene and vinyltoluene, nitriles, such as acrylonitrile and methacrylonitrile, vinyl halides and vinylidene halides, such as vinyl chloride and vinylidene fluoride, vinyl esters, such as vinyl acetate and vinyl propionate, and hydroxyl-containing monomers, such as hydroxyethyl acrylate and hydroxyethyl methacrylate, for example.

The epoxy-functional polyacrylate resin (component C) has an epoxide equivalent weight of from 350 to 2000. Usually, the epoxy-functional polyacrylate resins have a number-average molecular weight (determined by gel permeation chromatography using a polystyrene standard) of from 1000 to 15,000, and a glass transition temperature ($T_{gn}$) of 30–80 (measured with the aid of differential scanning calorimetry (DSC)).

The epoxy-functional acrylate resin can be prepared by generally well-known methods, by free-radical addition polymerization. Epoxy-functional polyacrylate resins of this kind are obtainable commercially, for example, under the designation Almatex PD 7610 and Almatex PD 7690 (manufacturer: Mitsui Toatsu).

As binders, the powder coating materials of the invention comprise as component D) 0.5–13.6% by weight of low molecular mass di- and/or polycarboxylic acids and/or di- and/or polyanhydrides. It is preferred as component D) to use saturated, aliphatic and/or cycloaliphatic dicarboxylic acids, such as glutaric acid, adipic acid, pimelic acid, suberic acid, azelaic acid, cyclohexanedicarboxylic acid, sebacic acid, malonic acid, dodecanedioic acid and succinic acid. Also suitable, furthermore, as component D) are aromatic di- and polycarboxylic acids, such as phthalic acid, terephthalic acid, isophthalic acid, trimellitic acid and pyromellitic acid, also of course in the form of their anhydrides where they exist. Particular preference is given to using as component D) dodecandioic acid (=1,10-decanedicarboxylic acid).

The amounts of the powder coating components A) to D) are chosen such that the ratio of the epoxide groups from B) and C) to the sum of the carboxyl and anhydride groups from A) and D) is 0.75–1.25:1. This ratio is preferably 0.9–1.1:1.

The powder coating materials comprise from 50 to 90%, preferably from 60 to 80% by weight of binder and from 10 to 50% by weight, preferably from 20 to 40% by weight of fillers.

Suitable fillers are glycidyl-functionalized, crystalline silica modifications. They are normally employed in the stated range of from 10 to 50% by weight, based on the overall weight of the powder coating material. In some cases, however, filler contents of more than 50% by weight are also possible.

The crystalline silica modifications include quartz, cristobalite, tridymite, keatite, stishovite, melanophlogite, coesite and fibrous silica. The crystalline silica modifications are glycidyl-functionalized, the glycidyl functionalization being obtained by surface treatment. The silica modifications concerned are, for example, based on quartz, cristobalite and fuzed silica and are prepared by treating the crystalline silica modifications with epoxy silanes. The glycidyl-functionalized silica modifications are obtainable on the market, for example, under the designation Silbond$^R$ 600 EST and Silbond$^R$ 6000 EST (manufacturer: Quarzwerke GmbH) and are prepared by reacting crystalline silica modifications with epoxy silanes.

The powder coating materials advantageously comprise from 10 to 40% by weight, based on the overall weight of the powder coating material, of glycidyl-functionalized crystalline silica modifications.

The powder coating materials may also comprise further inorganic fillers, examples being titanium oxide, barium sulfate and silicate-based fillers, such as talc, kaolin, magnesium silicates, aluminum silicates, micas and the like. The powder coating materials may, furthermore, if desired, contain auxiliaries and additives as well. Examples of these are leveling agents, flow aids and degassing agents, such as benzoin, for example.

To assist nondestructive gas expulsion, finally, degassing agents can be added to the powder coating material. The concentrations of this degassing agent are preferably $\leqq 2\%$ by weight, with particular preference from 0.1 to 0.8% by weight, with very particular preference from 0.2 to 0.5% by weight, and most preferably, $\leqq 0.4\%$ by weight.

Particularly suitable degassing agents are compounds of the formula $$R_2\text{—}\underset{\displaystyle \overset{|}{OH}}{R}\text{—}R_1$$

in which R is an alkanol having 1–6 carbon atoms. In this formula, $R_1$ and $R_2$ are benzoyl—or phenyl groups. $R_1$ and $R_2$ may, moreover, be identical or different. In other words, $R_1$ and $R_2$ can both be benzoyl or phenyl groups, respectively. Likewise, one radical can be a benzoyl group while the other radical is a phenyl group. Examples of compounds which can be employed with preference is benzoylphenylmethanol (benzoin).

The powder coating materials are prepared by known methods (cf. e.g. Product information from BASF Lacke+ Farben AG, “Pulverlacke” [Powder coating materials], 1990) by homogenization and dispersion by means, for example, of an extruder, screw compounder and the like. Following preparation of the powder coating materials, they are adjusted to the desired particle size distribution by milling, and if appropriate, by sieving and classifying.

The powder coating materials described are, following application, baked jointly with the electrodeposition coat. Baking of the electrodeposition and powder coats is accompanied by melting of the powder coating material and, consequently, by its equal distribution, and by curing of the binders. Baking is preferably conducted at temperatures of from 150 to 220° C. and, with very particular preference, at from 160 to 200° C. This baking operation last for from 10 to 40 minutes, preferably from 15 to 30 minutes.

Methods suitable for applying the powder coating material are all common prior art methods. Particular preference is given to application by electrostatic adhesion, preferably by applying a high voltage or by frictional charging.

The process of the invention finds a preferred application in connection with the coating of radiators, car bodies and automotive accessories, machine components, compressors, shelving units, office furniture and comparable industrial products.

The invention also provides a multilayer-coated substrate which is prepared by first applying a coat of electrodeposition coating material to the substrate in an electrodeposition coating bath and then, if desired, drying it, subsequently applying a coat of powder coating material and, finally, jointly baking electrodeposition coating material and powder coating material in one step.

The electrodeposition coat of the multiply coated substrate of the invention preferably has a thickness of from 5 to 35 μm, with very particular preference from 10 to 25 μm. The powder coat preferably has a thickness of from 30 to 200 μm, with very particular preference from 50 to 120 μm.

The implementation of the process of the invention and the preparation of the substrate of the invention are shown diagrammatically in FIGS. 1 and 2.

BRIEF DESCRIPTION OF THE DRAWINGS

FIG. 1 shows diagrammatically the layer structure of the substrate of the invention. On the substrate 1 itself there is located, first of all, the coat 2 of electrodeposition coating material, which is covered by a usually 10 times thicker coat 3 of powder coating material. For the preparation of the substrate of the invention, the substrate is first of all coated in an electrodeposition coating bath 4. It is then removed from the electrodeposition coating bath and dried in a drying unit 5 by blowing with air. Subsequently, and with, for example, application of a high voltage in a booth 6, powder coating material is sprayed in finely divided form onto the surface of the substrate. This powder coating material is then baked jointly in the oven 7 with the electrodeposition coat at temperatures of from about 150 to 220° C.

Figure 1:
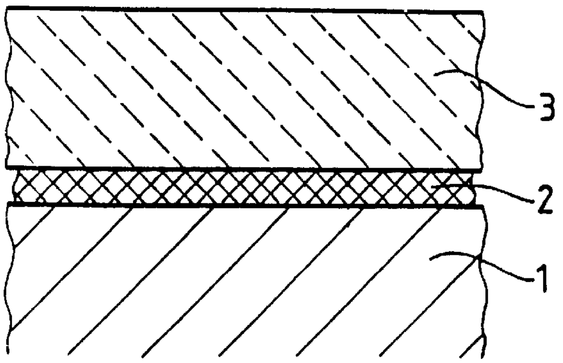
FIG. 1 shows the layer structure of the substrate.
Figure 2:
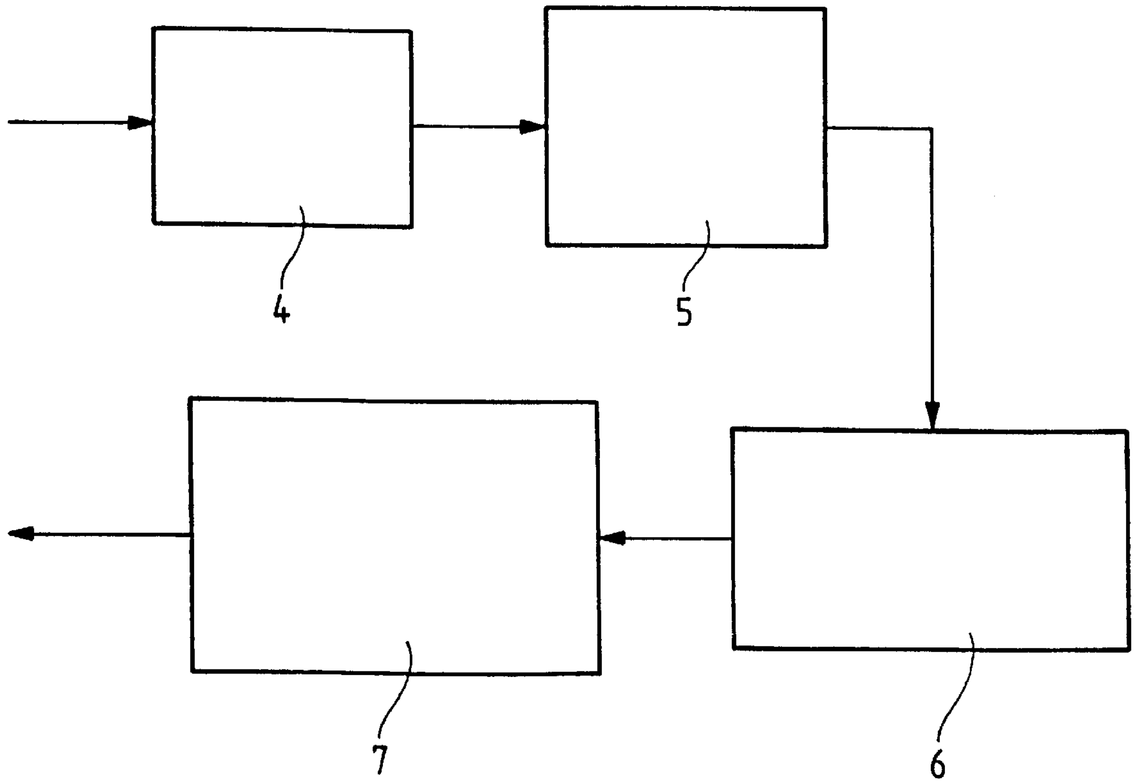
FIG. 2 shows the preparation steps.

In the text below the process of the invention is elucidated further with reference to an example.

1. Preparing an Amine-modified Epoxy Resin which Has Active Hydrogen Atoms

A reaction vessel is charged with 1780 g of Epikote 1001 (epoxy resin from Shell having an epoxide equivalent weight of 500), 280 g of dodecylphenol and 105 g of xylene and this initial charge is melted at 120° C. under a nitrogen atmosphere. Subsequently, under a gentle vacuum, traces of water are removed through an extraction circuit. Then 3 g of N,N-dimethylbenzylamine are added, the reaction mixture is heated to 180° C. and this temperature is maintained for about 3 h until the epoxide equivalent weight (EEW) has risen to 1162. The mixture is then cooled, and 131 g of hexyl glycol, 131 g of diethanolamine and 241 g of xylene are added in rapid succession. During these additions, the temperature rises slightly. Subsequently, the reaction mixture is cooled to 90° C. and diluted further with 183 g of butyl glycol and 293 g of isobutanol. When the temperature has fallen to 70° C., 41 g of N,N-dimethylaminopropylamine are added, this temperature is maintained for 3 h, and the product is discharged.

The resin has a solids content of 70.2% and a base content of 0.97 milliequivalent/gram.

2. Preparing a Blocked Aliphatic Polyisocyanate

A reaction vessel is charged under a nitrogen atmosphere with 488 g of hexamethylene diisocyanate which has been trimerized by isocyanurate formation (commercial product of BASF AG, having an isocyanate equivalent weight of 193) and with 170 g of methyl isobutyl ketone, and this initial charge is heated to 50° C. Then 312 g of di-n-butylamine are added dropwise at a rate such that the internal temperature is held at from 60 to 70° C. Following the end of the addition, stirring is continued at 75° C. for 1 h and then the reaction mixture is diluted with 30 g of n-butanol and cooled. The reaction product has a solids content of 79.6% (1 h at 130° C.) and an amine number of less than 5 mg of KOH/g.

3. Preparing an Aqueous Dispersion which Comprises a Cationic, Amine-modified Epoxy Resin Containing Active Hydrogen Atoms and a Blocked Aliphatic Polyisocyanate as Separate Component 1120 g of the resin solution prepared in section 1. are mixed at room temperature and with stirring with 420 g of the solution of the blocked polyisocyanate prepared in section 2. As soon as the mixture is homogeneous (after about 15 minutes), 2.2 g of a 50% strength by weight solution of a customary commercial antifoam (Surfynol; commercial product of Air Chemicals) in ethylene glycol monobutyl ether and 18 g of glacial acetic acid are stirred in. Subsequently, 678 g of deionized water, divided into 4 portions, are added. Subsequently, dilution is carried out with a further 1154 g of deionized water in small portions.

The resulting aqueous dispersion is freed from low-boiling solvents by vacuum distillation and then diluted with deionized water to a solids content of 33% by weight.

4. Preparing a Grinding Resin in Accordance with DE-A-34 22 457

640 parts of a diglycidyl ether based on bisphenol A and epichlorohydrin and having an epoxide equivalent weight of 485 and 160 parts of a similar compound having an epoxide equivalent weight of 189 are mixed at 100° C. A further vessel is charged with 452 parts of hexamethylenediamine, this initial charge is heated to 100°0 C., and 720 parts of the above hot epoxy resin mixture are added over the course of one hour, during which it is necessary to carry out gentle cooling in order to maintain the temperature at 100° C. After a further 30 minutes the excess hexamethylenediamine is stripped off under reduced pressure and elevated temperature, toward the end the temperature reaching 205° C. and the pressure 30 mbar. Subsequently, 57.6 parts of stearic acid, 172.7 parts of dimeric fatty acid and 115 parts of xylene are added. Then the water formed is distilled off azeotropically over 90 minutes at from 175 to 180° C.

Subsequently, 58 parts of butyl glycol and 322 parts of isobutanol are added. The product has a solids content of 70% by weight and a viscosity, measured at 75° C. with a cone-and-plate viscometer, of 2240 mPas.

5. Preparing a Pigment Paste 586 parts of the grinding resin prepared in section 4. are mixed thoroughly with 990 parts of deionized water and 22 parts of glacial acetic acid. This mixture is subsequently combined with 1129 parts of $TiO_2$ and 146 parts of an extender based on aluminum silicate. This mixture is comminuted in a milling apparatus to a Hegman fineness of less than 12 μm. Subsequently, deionized water is added until a solids content of from 48 to 52% by weight (1/2 h, 180° C.) has been reached.

6. Preparing an Electrodeposition Coating Bath which is Employed in Accordance with the Invention 810 parts by weight of the pigment paste prepared in section 5. are added to 2200 parts by weight of the dispersion prepared in section 3., and the mixture is made up to 5000 parts by weight with deionized water.

7. Preparing a Powder Coating Material Employed in Accordance with the Invention (More on Page 31a)

8. Coating Process According to the Invention

A flat radiator of height 600 mm and length 1000 mm, comprising 2 panels onto which 1 convector plate in each case is internally welded, is degreased and phosphatized and then lowered into an electro-deposition coating bath and connected as the cathode.

Parameters

Voltage between 100 and 400 V, preferably from 150 to 300 V

Temperature from 24 to 35° C., preferably from 28 to 32° C.

Time from 120 to 300 s, preferably from 150 to 240 s.

The radiator is then rinsed and blown with air until no further liquid drips off. The radiator is then externally coated with powder and baked in a drying oven from 150 to 220° C., preferably at from 160 to 200° C., for from 10 to 40 minutes, preferably from 15 to 30 minutes.

In order for the resulting powder coating film to exhibit no defects, as little as possible of elimination products and solvents should escape from the CED material during this baking operation. Preferably, the baking losses of the CED material should amount to not more than 15%, preferably not more than 13%.

POWDER EXAMPLE

Preparing an Epoxy-polyester Powder Coating Material

Into a primary mixer there are introduced 30 parts of polyester resin Uralac P 5980 (polyester resin from DSM, having an acid number of 70–85), 24 parts of epoxy resin Epikote 1055 (epoxy resin from Shell, having an epoxy equivalent weight of 850), 6 parts of a leveling agent masterbatch Epikote 3003 FCA-10, 0.2 part of a polypropylene wax Lancowax PP1362, 0.4 part of diphenoxy-2-propanol (degassing agent), 30 parts of titanium dioxide and 10 parts of calcium carbonate and these components are premixed. In an extruder, this premix is dispersed at operating temperatures between 100 and 130° C. and, following discharge from the extruder die, is cooled as rapidly as possible over quenching rolls. Milling is carried out in classifier mills. A classified particle size adjustment has been found to be particularly favorable.

Line 24 The radiator is then electrostatically coated externally with powder coating material.

Parameters: gun voltage from 50 to 90 kilovolts, gun/radiator distance from 15 to 45 cm.

What is claimed is:

1. A process for the multilayer coating of substrates with electrodeposition and powder coating materials, comprising a) applying at least one coat of an electrodeposition coating material to a substrate, b) drying partially or wholly the at least one coat of the electrodeposition coating material at a temperature of ≦100° C., c) applying at least one coat of powder coating material to the at least one coat of an electrodeposition coating material, and d) jointly baking the at least one coat of an electrodeposition coating material and the at least one coat of powder coating material, wherein drying is carried out until the difference in weight between the dried electrodeposition coating material and the baked electrodeposition coating is less than 20%.

2. The process of claim 1, wherein the drying of the at least one coat of electrodeposition coating material takes place by blowing with air at temperatures of ≦40° C.

3. The process of claim 1, wherein drying lasts ≦60 minutes.

4. The process of claim 1 wherein the joint baking of the electrodeposition coating material and powder coating material takes place at temperatures from 150 to 220° C.

5. The process of claim 4, wherein the joint baking takes place for a duration of from 10 to 40 minutes.

6. The process of claim 4, wherein the joint baking takes place for a duration of from 15 to 30 minutes.

7. The process of claim 1, wherein the powder coating material is applied by electrostatic adhesion.

8. The process of claim 1, wherein the electrodeposition coating material crosslinks at a temperature less than 170° C.

9. The process of claim 1, wherein the powder coating material has a crosslinking temperature of from 10 to 60° C. above the crosslinking temperature of the electrodeposition coating material.

10. The process of claim 1, wherein the powder coating material comprises one or more degassing agent in a concentration of up to 2% by weight.

11. The process of claim 10, wherein the powder coating material comprises degassing agents comprising compounds of the formula

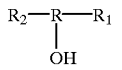

in which R is analkanol having 1–6 carbon atoms and $R_1$ and $R_2$ are benzoyl- or phenyl groups, and where $R_1$ and $R_2$ can be identical or different.

12. A layered material comprising at least two coats on a substrate, which is prepared according to the process of claim 1.

13. The layered material of claim 1, having an electrodeposition coating material with a thickness of from 5 to 35 μm.

14. The layered material of claim 13, having an electrodeposition coating material with a thickness of from 10 to 25 μm.

15. The layered material of claim 1, having a powder coating material with a thickness of from 30 to 200 μm.

16. The layered material of claim 15, having a powder coating material with a thickness of from 50 to 120 μm.

17. The process of claim 1 wherein the substrate comprises one or more metals.

18. The process of claim 17, wherein the metal substrate is selected from the group consisting of iron, zinc, and mixtures thereof.

19. The process of claim 1, wherein the optional drying takes place at temperatures of ≦40° C.

20. The process of claim 1, wherein drying lasts ≦30 minutes.

21. The process of claim 1 wherein the joint baking of the electrodeposition coating material and powder coating material takes place at temperatures from 160 to 200° C.

22. The process of claim 1, wherein the powder coating material is applied by electrostatic adhesion selected from the group consisting of high voltage and frictional charging.

23. The process of claim 1, wherein the electrodeposition coating material crosslinks at a temperature of from 140° C. to 160° C.

24. The process of claim 1, wherein the powder coating material has a crosslinking temperature of from 10 to 40° C. above the crosslinking temperature of the electrodeposition coating material.

25. The process of claim 1, wherein the powder coating material comprises one or more degassing agents in a concentration of 0.4% by weight.

26. A process for the multilayer coating of substrates with electrodeposition and powder coating materials, comprising a) applying at least one coat of an electrodeposition coating material to a substrate, b) optionally drying partially or wholly the at least one coat of the electrodeposition coating material at a temperature of ≦100° C., c) applying at least one coat of powder coating material to the at least one coat of an electrodeposition coating material, and d) jointly baking the at least one coat of an electrodeposition coating material and the at least one coat of powder coating material, wherein the powder coating material comprises a film-forming material comprising:

A) from 35 to 92.2% by weight of a carboxyl-containing polyesters haivng an acid number of 10–150 mg of KOH/g, B) from 0.8 to 20.1% by weight of low molecular mass curing agents containing epoxide groups, C) from 3.7 to 49.3% by weight of epoxy-functional polyacrylate resins having an epoxide equivalent weight of 350 to 2000, and D) from 0.5 to 13.6% by weight of low molecular mass compounds selected from the group consisting of dicarboxylic acids, polycarboxylic acids, dianhydrides, polyanhydrides, and mixtures thereof.

27. The process of claim 26, wherein drying is carried out until the difference in weight between the dried electrodeposition coating material and the baked electrodeposition coating is less than 20%.

28. The process of claim 27, wherein drying is carried out until the difference in weight between the dried electrodeposition coating material and the baked electrodeposition coating is less than 13%.

* * * * *